(12) United States Patent
Anderson et al.

(10) Patent No.: US 7,766,277 B2
(45) Date of Patent: Aug. 3, 2010

(54) DEFORMABLE FORWARD PRESSURE BULKHEAD FOR AN AIRCRAFT

(75) Inventors: Barney B. L. Anderson, Derby, KS (US); Jeffrey R. Swada, Rose Hill, KS (US); William J. Koch, Bellevue, WA (US)

(73) Assignee: The Boeing Company, Chicago, IL (US)

( * ) Notice: Subject to any disclaimer, the term of this patent is extended or adjusted under 35 U.S.C. 154(b) by 363 days.

(21) Appl. No.: 11/335,275

(22) Filed: Jan. 19, 2006

(65) Prior Publication Data

US 2007/0164152 A1    Jul. 19, 2007

(51) Int. Cl.
*H01Q 1/42* (2006.01)
(52) U.S. Cl. ........................... 244/121; 343/872
(58) Field of Classification Search ................. 244/119, 244/117 R, 121, 133; 343/872
See application file for complete search history.

(56) References Cited

U.S. PATENT DOCUMENTS

| | | | | |
|---|---|---|---|---|
| 3,010,398 A | * | 11/1961 | Parlanti | 244/121 |
| 3,674,227 A | * | 7/1972 | Jacobson et al. | 244/121 |
| 3,925,783 A | * | 12/1975 | Bleday et al. | 343/705 |
| 4,073,985 A | * | 2/1978 | San Miguel | 428/35.7 |
| 4,173,187 A | * | 11/1979 | Steverding | 250/515.1 |
| 4,275,859 A | * | 6/1981 | Bleday | 244/121 |
| 5,062,589 A | | 11/1991 | Roth et al. | |
| 5,143,276 A | * | 9/1992 | Mansbridge et al. | 228/157 |
| 5,323,170 A | * | 6/1994 | Lang | 343/872 |
| 5,344,685 A | * | 9/1994 | Cassell | 428/64.1 |
| 5,457,471 A | * | 10/1995 | Epperson, Jr. | 343/872 |
| 5,662,293 A | * | 9/1997 | Hower et al. | 244/133 |
| 5,691,736 A | * | 11/1997 | Hunn et al. | 343/872 |
| 5,934,616 A | * | 8/1999 | Reimers et al. | 244/119 |
| 6,107,976 A | * | 8/2000 | Purinton | 343/872 |
| 6,213,426 B1 | | 4/2001 | Weber et al. | |
| 6,378,805 B1 | * | 4/2002 | Stephan et al. | 244/119 |
| 6,443,392 B2 | * | 9/2002 | Weber et al. | 244/117 R |
| 2006/0022088 A1 | | 2/2006 | Dazet et al. | |

FOREIGN PATENT DOCUMENTS

EP    0387400 A2    9/1990
EP    1544104 A1    6/2005

OTHER PUBLICATIONS

PCT Search Report PCT/US06/47460, Jul. 13, 2007, The Boeing Company.
PCT Written Opinion PCT/US06/47460, Jul. 13, 2007, The Boeing Company.

* cited by examiner

*Primary Examiner*—Benjamin P Lee
(74) *Attorney, Agent, or Firm*—Tung & Associates

(57) ABSTRACT

An aircraft forward pressure bulkhead as described herein includes a malleable and deformable dome that is configured to "catch" foreign objects, such as birds. The dome is intentionally designed to deform in response to a foreign object strike that imparts at least a threshold amount of impact energy to the bulkhead. The dome is free of rigid stiffeners and non-deformable reinforcement members that would otherwise hinder the flexible characteristic of the dome. Practical embodiments of the bulkhead utilize fewer parts, are less heavy, and are less expensive than traditional bulkheads that utilize rigid stiffeners.

18 Claims, 3 Drawing Sheets

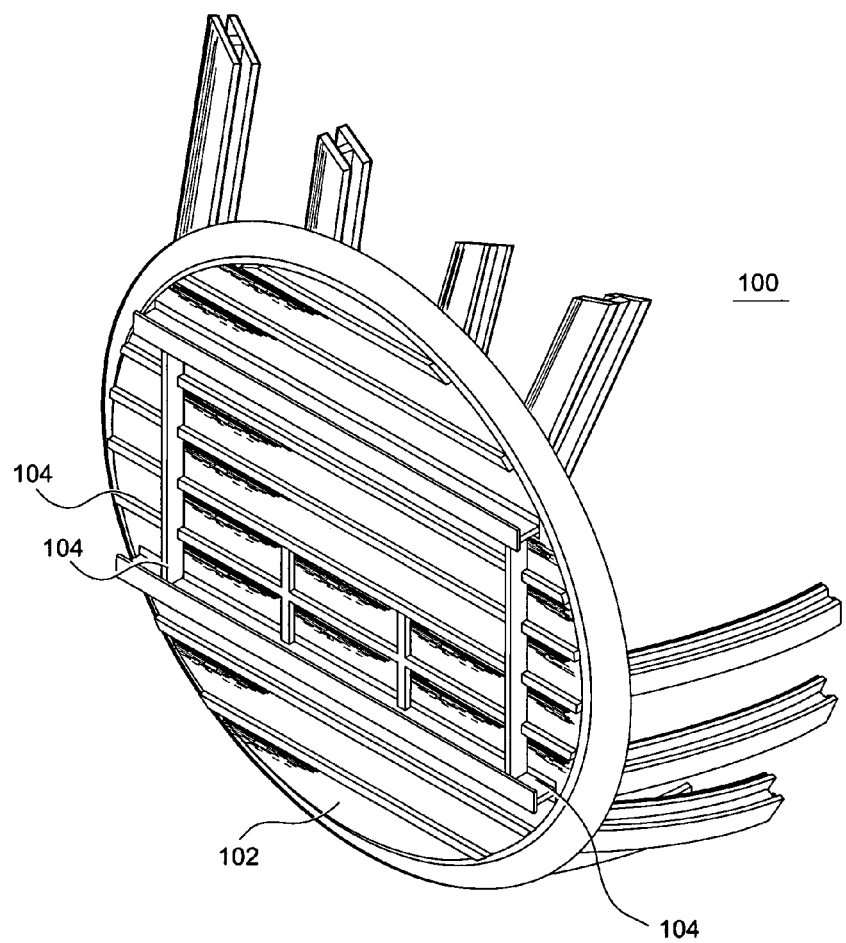
*FIG. 1-PRIOR ART*
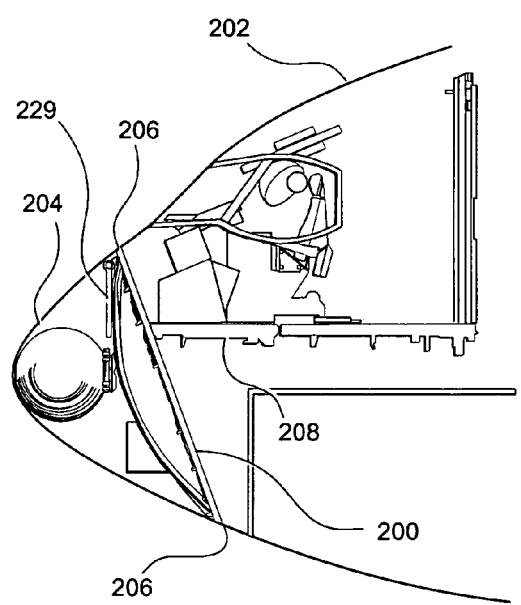
*FIG. 2*

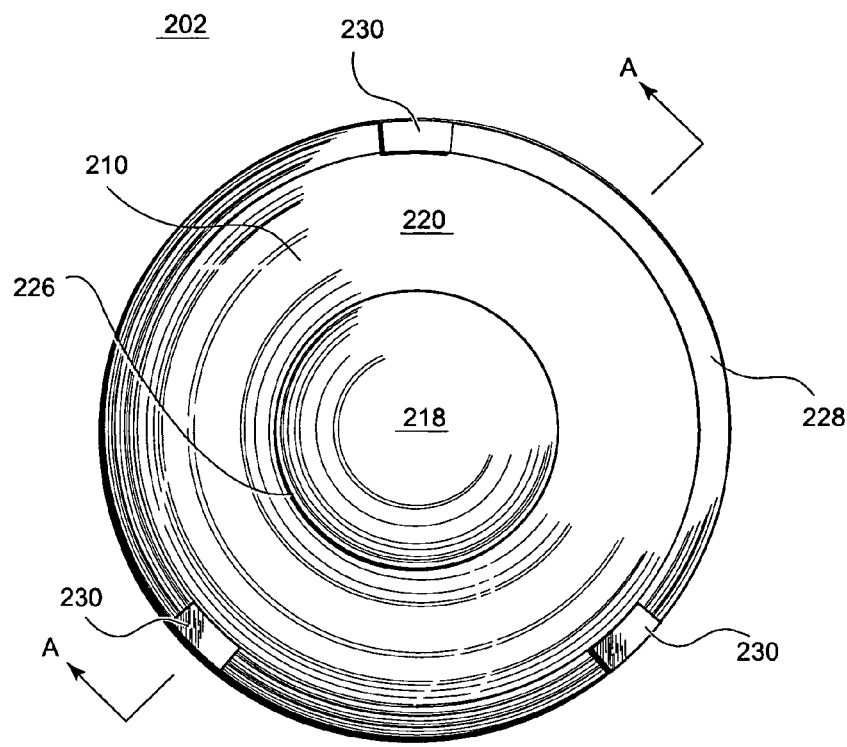
FIG. 5
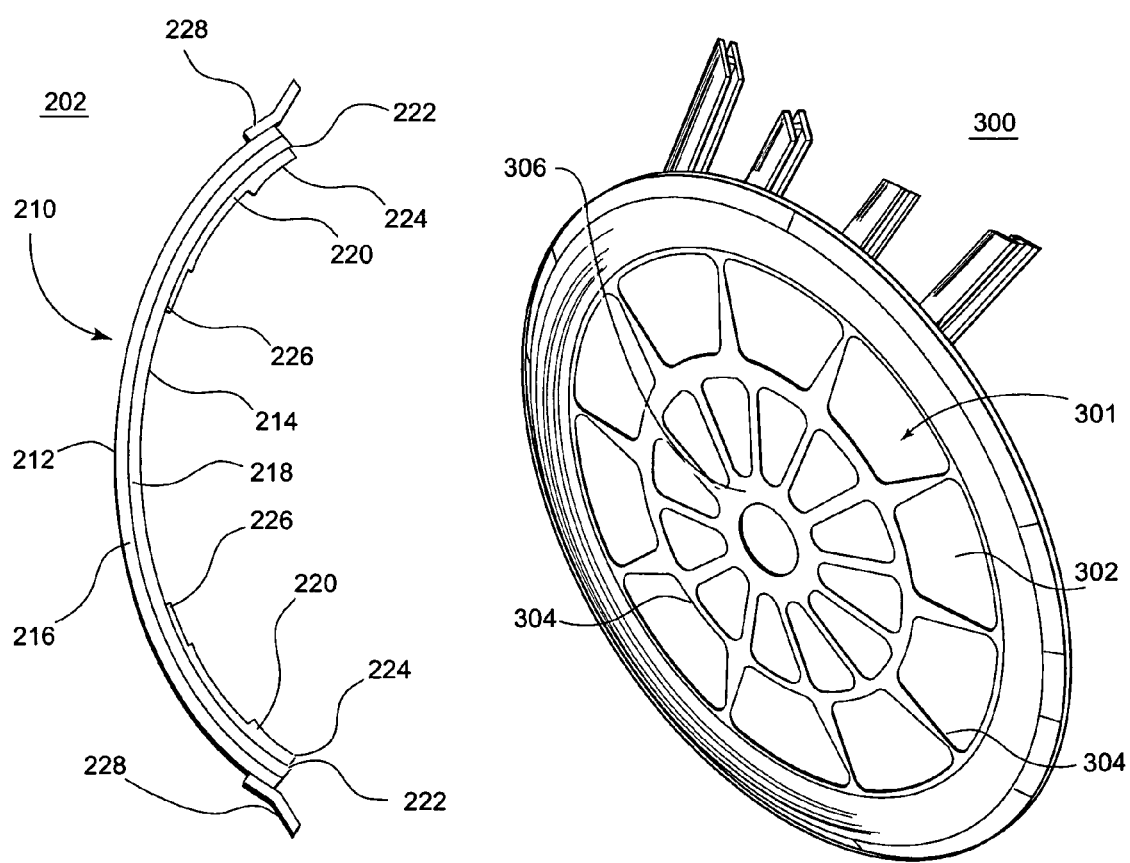
FIG. 6
FIG. 7

DEFORMABLE FORWARD PRESSURE BULKHEAD FOR AN AIRCRAFT

TECHNICAL FIELD

The present disclosure relates generally to aircraft structures. More particularly, the present disclosure relates to an aircraft pressure bulkhead.

BACKGROUND

The forward pressure bulkhead in an aircraft is located at the nose of the fuselage, and it serves as a barrier for the pressurized interior cabin environment. The front side of the forward pressure bulkhead is typically surrounded by the radome or "nose cone" of the aircraft, which houses an antenna and/or other equipment for the aircraft. The inside of the radome is not pressurized, i.e., it is exposed to ambient air conditions. The radome is typically formed from a lightweight and electromagnetic transparent material such as fiberglass. Consequently, the forward pressure bulkhead is designed to provide additional protection against foreign objects, such as birds, which may strike the nose of the aircraft.

Conventional forward pressure bulkheads are designed to rigidly withstand impacts by providing a "brick wall" protection mode. In other words, conventional forward pressure bulkheads are engineered to resist bird penetration with very low structural deflection. In this regard, such forward pressure bulkheads utilize rigid reinforcement beams, ribs, or other components that support the main bulkhead panel. Therefore, such forward pressure bulkheads are typically fabricated from many separate components that are welded, riveted, or otherwise connected together to form the desired structure. The resulting structure can include a large parts count, which increases the cost of the forward pressure bulkhead.

Accordingly, it is desirable to have an aircraft forward pressure bulkhead that is less expensive, requires fewer parts, and is lighter than prior art designs. Furthermore, other desirable features and characteristics of the present disclosure will become apparent from the subsequent detailed description and the appended claims, taken in conjunction with the accompanying drawings and the foregoing technical field and background.

BRIEF SUMMARY

An aircraft forward pressure bulkhead according to an example embodiment of the disclosure employs a malleable dome element rather than a heavy stiffened panel and beam structure. The dome is flexible enough to deform, under the impact of a bird strike, thus absorbing and dissipating the impact energy through plastic deformation. In general, the bird energy is absorbed by the integral of the force multiplied by bulkhead deflection for the duration of impact. Therefore, large deflections reduce the force which is roughly inversely proportional to the bulkhead deflection. This reduces the bulkhead weight significantly.

In practice, an aircraft forward pressure bulkhead configured in accordance with the example embodiment of the disclosure is able to accommodate the cabin pressurization forces while providing protection against foreign objects without resorting to the traditional "brick wall" approach. It can be demonstrated that a sphere is the lightest possible pressure vessel, so a substantially spherical bulkhead also carries a natural structural advantage in resisting the pressure load. The example embodiment described herein uses fewer parts and is lightweight relative to conventional aircraft forward pressure bulkhead designs.

The above and other aspects of the disclosure may be carried out in one form by an aircraft forward pressure bulkhead having a malleable dome that is configured to deform in response to a threshold amount of impact energy caused by a foreign object strike, thus absorbing and dissipating at least a portion of the impact energy. The aircraft forward pressure bulkhead is void of any rigid non-deformable reinforcement members. In a practical embodiment, the bulkhead absorbs and dissipates a significant portion of the impact energy. In addition to the fact that higher deflections produce lower forces, large deflections also allow the bird to spread out over a larger area during impact than would occur with a "rigid" bulkhead. By way of example, while a rigid bulkhead may typically deflect on the order of 0.1 to 0.2 inches, a bulkhead configured in accordance with the disclosure may have deflections of one to several inches as the dome becomes partially or fully inverted. Thus, the time duration of impact is typically one to two orders of magnitude longer, thereby allowing the bird energy to dissipate and disperse.

BRIEF DESCRIPTION OF THE DRAWINGS

A more complete understanding of the present disclosure may be derived by referring to the detailed description and claims when considered in conjunction with the following figures, wherein like reference numbers refer to similar elements throughout the figures.

FIG. 1 is a perspective front view of a prior art aircraft forward pressure bulkhead;

FIG. 2 is a schematic side view of a forward pressure bulkhead according to an example embodiment of the disclosure, as installed in an aircraft;

FIG. 5 is a rear view of the forward pressure bulkhead shown in FIG. 2;

FIG. 6 is a cross sectional view of the forward pressure bulkhead shown in FIG. 5, as viewed along line A-A; and FIG. 7 is a perspective front view of a forward pressure bulkhead according to an alternate embodiment of the disclosure.

DETAILED DESCRIPTION

The following detailed description is merely illustrative in nature and is not intended to limit the disclosure or the application and uses of the disclosure. Furthermore, there is no intention to be bound by any expressed or implied theory presented in the preceding technical field, background, brief summary or the following detailed description. For the sake of brevity, conventional techniques and features related to aircraft design, aircraft structures, aircraft manufacturing, and other aspects of the bulkheads (and the individual operating components of the bulkheads) may not be described in detail herein.

The following description refers to elements or features being "connected" or "coupled" together. As used herein, unless expressly stated otherwise, "connected" means that one element/feature is directly joined to (or directly communicates with) another element/feature, and not necessarily mechanically. Likewise, unless expressly stated otherwise, "coupled" means that one element/feature is directly or indirectly joined to (or directly or indirectly communicates with) another element/feature, and not necessarily mechanically.

FIG. 1 is a perspective front view of a prior art aircraft forward pressure bulkhead 100. Bulkhead 100 is installed at the front of an aircraft adjacent to an unpressurized nose radome. Bulkhead 100 maintains the pressurization inside the aircraft cabin while providing a measure of physical protection against strikes from foreign objects such as birds. In this regard, bulkhead 100 includes a generally flat and disk shaped face plate 102. Face plate 102 is designed to be rigid, non-deformable, and non-malleable, such that it provides a solid and "impenetrable" wall under normal flight conditions. Notably, face plate 102 is supported by a plurality of stiffening ribs 104, which provide rigid reinforcement to face plate 102. The stiffening ribs 104 are physically coupled to the exposed surface of face plate 102. Additional stiffening ribs (hidden from view) are also located on the opposite surface of face plate 102. These stiffening ribs 104 are intentionally designed to be non-deformable and non-malleable structural support members for bulkhead 100. In practical deployments, the use of stiffening ribs 104 adds to the overall parts count, expense, weight, and manufacturing complexity of bulkhead 100.

Figure 3:
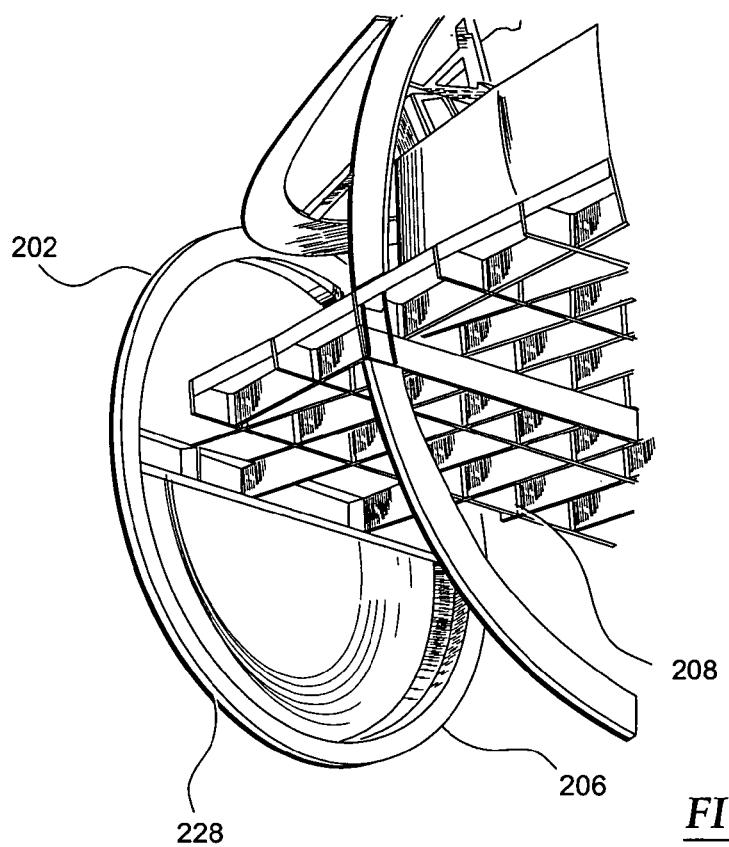
FIG. 3 is a schematic rear view of the forward pressure bulkhead shown in FIG. 2.
Figure 4:
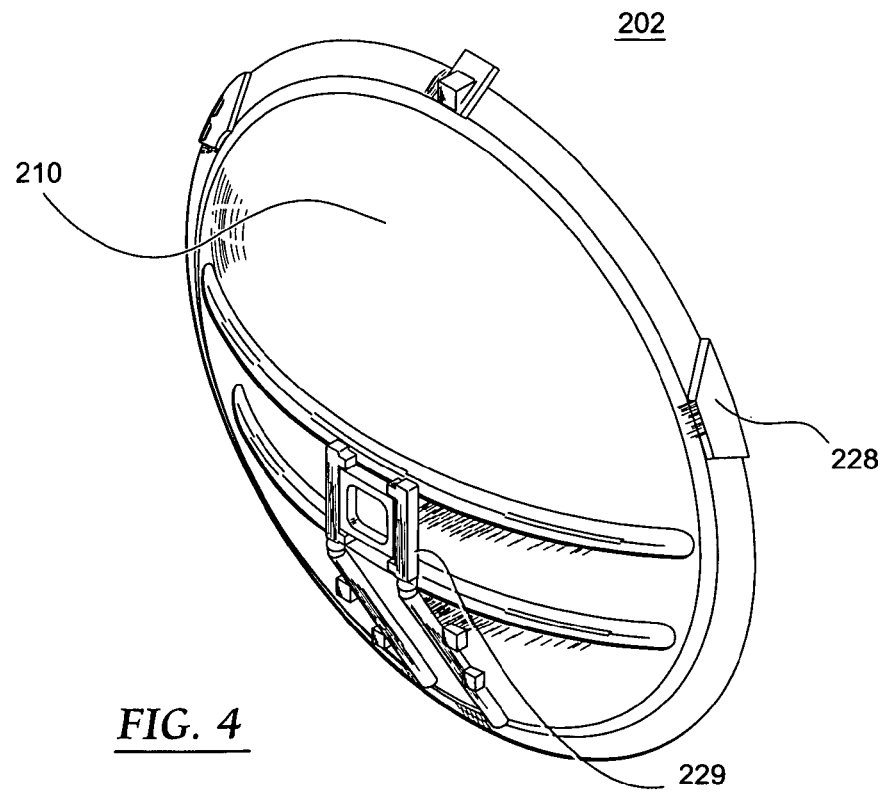
FIG. 4 is a perspective front view of the forward pressure bulkhead shown in FIG. 2.

FIG. 2 is a schematic side view of a forward pressure bulkhead 200 according to an example embodiment of the disclosure, as installed in an aircraft 202, FIG. 3 is a schematic rear view of forward pressure bulkhead 200, FIG. 4 is a perspective front view of forward pressure bulkhead 200, FIG. 5 is a rear view of forward pressure bulkhead 200, and FIG. 6 is a cross sectional view of forward pressure bulkhead 200 as viewed along line A-A in FIG. 5. Bulkhead 200 is generally configured to be used as a forward pressure bulkhead adjacent to an unpressurized nose radome 204 of aircraft 202. Bulkhead 200 is suitably configured to withstand pressure loading when the aircraft cabin is pressurized relative to ambient air pressure outside the aircraft. Bulkhead 200 leverages the natural characteristics of a dome shape to carry the pressure forces with a light malleable membrane rather than a heavy stiffened "panel and beam" structure as depicted in FIG. 1. The dome element is flexible enough to deform under the impact of a bird strike, thus absorbing and dissipating at least a portion of the impact energy through plastic deformation. This characteristic of bulkhead 200 addresses the need for a lightweight structure for airplane pressurization, while providing protection against foreign objects without resorting to the traditional "brick wall" approach. In practice, bulkhead 200 assumes a substantially spherical shape that corresponds to the natural pressurization forces asserted by the cabin pressure. Thus, the dome of bulkhead 200 need only resist in a pure tensile mode, which it does in a very efficient manner. By being forgiving enough to "catch" a bird, but not allowing penetration, bulkhead 200 provides effective protection at the minor cost of a small amount of additional space needed to accommodate deflections. That additional space is also balanced to some degree by the space required to accommodate stiffeners in the traditional approach.

FIG. 2 depicts a typical installation location for bulkhead 200. In this example embodiment, bulkhead 200 is slightly canted in a forward direction relative to the front of aircraft 202. For this example installation, bulkhead 200 may be canted approximately 5-7 degrees relative to a vertical plane. Canting the dome allows for greater energy absorption by allowing the bird to spread over a larger area, but is not a necessary feature of the disclosure. The bulkhead 200 is coupled with an outer chord 206. The purpose of the outer chord 206 is to react the tension load due to pressurization of the bulkhead membrane through hoop compression in the ring. In other embodiments, the pressure load may be reacted by the dome itself or other parts of the aircraft structure. In practice, bulkhead 200 may be coupled to support and/or frame structures of aircraft 202 such that the outer chord 206 of bulkhead 200 remains stationary. For example, bulkhead 200 may be attached to a rigid frame 208 that provides an interface between bulkhead 200, the crew floor, radome 204, and the aircraft skin. Frame 208 may be formed from any suitable material, such as aluminum. In the example embodiment, frame 208 is realized as a monolithic sub-structure that is machined from a single piece of three inch thick aluminum plate. The specific design, configuration, and composition of frame 208 can vary to suit the needs of the given aircraft.

Referring to FIGS. 4-6, bulkhead 200, of FIG. 2, generally includes a malleable dome 210 that is suitably configured to deform in response to a threshold amount of impact energy caused by a foreign object strike. In this manner, dome 210 can absorb and dissipate at least a portion of the impact energy and the residual being absorbed by the underlying aircraft structure. Notably, bulkhead 200 and dome 210 are void of any rigid reinforcement members (in contrast to conventional designs that utilize stiffener members). Moreover, dome 210 includes no holes or penetrations other than fastener locations near the perimeter edge of bulkhead 200. In the example embodiment, dome 210 is formed from an aluminum alloy, such as 2024-T3 aluminum. Of course, dome 210 may be formed from other suitable materials, alloys, and compositions, including KEVLAR, SPECTRA, ZYLON, fiberglass, thermoplastics such as PEEK and PEKK, or virtually any practical material. Material with higher plastic strain to failure and higher strength may typically absorb more energy, but bulkhead 200 may be configured to allow for significant energy absorption through elastic as well as plastic deflection of the dome 210. In practice, dome 210 can be generally shaped as a substantially spherical cap (i.e., a section of a spherical shell) having a convex front surface 212 and a concave aft surface 214. In this example, dome 210 is formed with a spherical radius of approximately 120 inches, the diameter at the base of dome 210 is approximately 85.4 inches, and the depth of dome 210 is approximately eight inches. Dome 210 is configured to withstand pressurized air loading applied to concave aft surface 214 relative to ambient air pressure exposed to convex front surface 212. Such differential pressure conditions occur during normal operation of the aircraft.

Dome 210 may be formed from a single sheet of material. Multiple layers are not a necessary feature of the disclosure, in practical embodiments, however, dome 210 is realized as a multilayered component to provide a failsafe measure for bulkhead 200. In this example, dome 210 includes a first full layer 216, a second full layer 218 coupled to first full layer 216, and a partial layer 220 coupled to second full layer 218. The layers can be attached together using any suitable mechanism or technique, such as cold bonding, hot bonding, mechanical fasteners, welding, clamps, or the like. The first and second layers are "full" relative to partial layer 220, which does not span the entire surface of dome 210. In other words, the first 216 and second layers 218 are "redundant" layers because they each generally define a substantially spherical cap. Partial layer 220, however, generally defines a truncated substantially spherical cap, or a ring shaped layer having a substantially spherical contour. Dome 210 includes an outer perimeter 222 that is generally defined by its circular edge. As shown in FIG. 5 and FIG. 6, partial layer 220 is located adjacent to outer perimeter 222. In other words, partial layer 220 forms a ring layer that circles the periphery of second full layer 216. Thus, the exposed outer surface of first full layer 216 represents convex front surface 212, while the exposed outer surface of second full layer 218, along with the exposed outer surface of partial layer 220, represents concave aft surface 214. Thus, first full layer 216 generally corresponds to the front side of bulkhead 200, and partial layer 220 generally corresponds to the aft side of bulkhead 200.

First full layer 216, second full layer 218, and partial layer 220 are each formed from a ductile and deformable material, which facilitates the impact energy absorbing and dissipating properties of bulkhead 200 as described above. In one practical embodiment, first full layer 216 and second full layer 218 are each formed from a sheet of aluminum that is approximately 0.063 inch thick. In particular, these full layers may be formed from a seamless sheet of 2024-T3 aluminum alloy. Partial layer 220 may also be formed from a seamless sheet of 2024-T3 aluminum alloy. In the example embodiment, partial layer 220 has a variable thickness that decreases towards the center of dome 210. For ease of manufacturing, the variable thickness may (but need not be) be formed in discrete steps, as depicted in FIG. 6. In this regard, partial layer 220 has an outer edge 224 located toward outer perimeter 222, and an inner edge 226 located toward the center of dome 210. Inner edge 226 is approximately 14-17 inches from outer edge 224 in this embodiment (in one practical embodiment, partial layer 220 is about 15.7 inches wide). Outer edge 224 may have a thickness of approximately 0.125 inch, and inner edge 226 may have a thickness of approximately 0.031 inch. In practice, partial layer 220 may include any number of intermediate steps having decreasing thicknesses between outer edge 224 and inner edge 226. The relatively thick portion of dome 210 near outer perimeter 222 is desirable to provide additional strength for mounting of bulkhead 200. The variation in shell thickness of dome 210 also provides additional resistance to impact stresses near the edge of dome 210. Stresses are higher toward the edge due to reduced compliance of the dome 210 in those areas.

Dome 210 (and any layer thereof) may be formed using any suitable manufacturing technique. For example, dome 210 may be manufactured using a bulge forming technique that applies pressure to a flat sheet to shape the substantially spherical cap. Alternatively, dome 210 may be manufactured using a spin forming technique that rotates a flat sheet while applying pressure with a forming tool to create a dished shape. Dome 210 may also be formed using stamping or pressing techniques.

Bulkhead 200 also includes an outer chord 228 that is coupled to dome 210 around outer perimeter 222. In this embodiment, the outer chord 228 is composed of multiple segments of 7075 T73 aluminum formed such that its cross section is an angle formed by one leg that matches the contour of the dome 210 and a secondary leg that matches the contour of the fuselage. The purpose of the angle is to integrate the dome 210 to the fuselage and to lend stiffness to the outer chord 228 such that it resists compression loads caused by membrane tension in the dome 210.

Outer chord 228 is suitably configured to provide a rigid attachment mechanism for bulkhead 200. Referring again to FIG. 2 and FIG. 3, outer chord 228 can be utilized to attach bulkhead 200 to frame 208, a windshield support, and/or other structures of aircraft 202. Outer chord 228 may also be configured to accommodate attachment of the aircraft fuselage skin. As depicted in FIG. 2 and FIG. 4, outer chord 228 may also provide attachment points for an antenna support assembly 229. Notably, antenna support assembly 229 need not be attached to dome 210 itself. Rather, antenna support assembly 229 preferably forms a "bridge" over dome 210. Indeed, bulkhead 200 is preferably configured such that no rigid stiffeners or reinforcement members are directly attached to either side of dome 210, thus making dome 210 free to deflect and deform in response to a foreign object strike.

In a practical embodiment, outer chord 228 can be formed from any suitable material, for example, aluminum alloy 7075-T7351 or aluminum alloy 7050-T7451. For ease of manufacturing and assembly, outer chord 228 may be realized as a segmented component that is spliced together. FIG. 5 shows outer chord 228 in three segments joined by three splicing elements 230. Outer chord 228 is coupled to dome 210 using suitable fasteners or fastening techniques, such as bolts, rivets, clamps, bonding, welding, or the like. In turn, bulkhead 200 is coupled to aircraft 202 (via outer chord 228) using suitable fasteners or fastening techniques, such as bolts, rivets, clamps, bonding, welding, or the like.

An aircraft forward pressure bulkhead configured in accordance with an alternate embodiment of the disclosure may employ at least one malleable and deformable tear strap layer coupled to a malleable dome (as described above). In other embodiments the tear strap layer could also be composed of malleable or deformable stiffeners. The malleable and deformable tear strap layer or stiffener layer is configured to retard fatigue and dynamic changes to the malleable dome while remaining flexible enough to accommodate the impact energy absorbing and dissipating characteristics of the bulkhead. FIG. 7 is a perspective front view of a forward pressure bulkhead 300 according to one such alternate embodiment. Bulkhead 300 shares a number of features with bulkhead 200; such common features and aspects will not be redundantly described herein. Bulkhead 300 includes a malleable dome 301 having at least a first full layer 302 and at least one malleable and deformable tear strap layer 304 coupled to full layer 302. In this example embodiment, bulkhead 300 includes a web layer 306 coupled to full layer 302, where the at least one tear strap layer 304 is defined by web layer 306. In other words, web layer 306 includes tear strap layer 304, thus resembling a spider web. Web layer 306 itself is deformable and malleable, which enables bulkhead 300 to absorb and dissipate impact energy in the manner described above. Thus, web layer 306 may be employed to enhance the structural integrity of bulkhead 300 in a forgiving manner in contrast to prior art techniques that rely on a rigid, non-deformable, "brick wall" configuration.

A practical embodiment of the aircraft forward pressure bulkhead described herein is designed to withstand a strike from a four pound object traveling at cruise velocity (Vc) at sea level or 0.85 Vc at 8000 feet, whichever is critical, as required by Federal Aviation Regulation §25.571. This and other embodiments of the disclosure may withstand differing bird weights and velocities depending on the requirement. In practice, the bulkhead has a threshold impact energy rating that determines whether the bulkhead dome may deform and deflect in response to the impact. The curved and angled surface of the bulkhead increases the likelihood that objects may deflect away from the dome. If an object strikes the bulkhead without imparting at least that threshold impact energy, then the object may either bounce off of the dome or deflect away from the dome. Under such conditions, the dome may temporarily deflect inward then snap back to its original shape. If, however, an object strikes the bulkhead with at least the threshold impact energy, then the dome may "catch" the object, deflect inward, and deform in a manner that absorbs and dissipates the impact energy. In this regard, the dome buckles under the impact force of the object, which travels a short distance in the aft direction after contact with the dome. The malleable nature of the dome enables the bulkhead to dissipate the impact force over a longer impact time (relative to rigid and stiff bulkheads). The dome may remain in a buckled or bent shape after impact, or it may snap back to its original shape. If the internal pressure may not restore the original shape of the bulkhead, it may then be restored by physical manipulation, or it may be replaced depending upon the severity of the deformation.

While at least one example embodiment has been presented in the foregoing detailed description, it should be appreciated that a vast number of variations exist. It should also be appreciated that the example embodiment or embodiments described herein are not intended to limit the scope, applicability, or configuration of the disclosure in any way. Rather, the foregoing detailed description will provide those skilled in the art with a convenient road map for implementing the described embodiment or embodiments. It should be understood that various changes can be made in the function and arrangement of elements without departing from the scope of the disclosure as set forth in the appended claims and the legal equivalents thereof.

What is claimed is:

1. An aircraft forward pressure bulkhead comprising a malleable dome that is configured to deform in response to a predetermined threshold amount of impact energy caused by a foreign object strike, thus absorbing and dissipating at least a portion of the impact energy, said aircraft forward pressure bulkhead being void of any rigid non-deformable reinforcement members;
   wherein said malleable dome comprises a constant radius of curvature extending from a center portion to an outer edge portion, said malleable dome comprising a partial layer on a concave aft surface of said malleable dome, said partial layer being located around an outer perimeter of said malleable dome, said partial layer including the same said radius of curvature;
   said malleable dome further comprising at least one full layer on a convex side of said malleable dome and a second full layer coupled to said first full layer, said at least one full layer and said second layer having the same said radius of curvature;
   wherein said partial layer has a variable thickness that decreases towards the center of said malleable dome; and
   an outer chord coupled to said malleable dome around said outer perimeter, said outer chord providing a rigid attachment mechanism for said aircraft forward pressure bulkhead.

2. An aircraft forward pressure bulkhead according to claim 1, said first full layer corresponding to a front side of said aircraft forward pressure bulkhead, and said partial layer corresponding to an aft side of said aircraft forward pressure bulkhead.

3. An aircraft forward pressure bulkhead according to claim 1, said partial layer having an outer edge located toward said outer perimeter, and an inner edge located toward the center of said malleable dome, where said outer edge corresponds to a maximum thickness of said partial layer and said inner edge corresponds to a minimum thickness of said partial layer.

4. An aircraft forward pressure bulkhead according to claim 1, said partial layer having an outer edge located toward said outer perimeter, and an inner edge located toward the center of said malleable dome, said inner edge being displaced toward a center of said dome an approximately constant distance from said outer edge.

5. An aircraft forward pressure bulkhead according to claim 1, said malleable dome being formed from aluminum.

6. An aircraft forward pressure bulkhead according to claim 1, said malleable dome comprising a convex front surface.

7. An aircraft forward pressure bulkhead according to claim 6, said malleable dome being shaped as a spherical cap.

8. An aircraft forward pressure bulkhead according to claim 6, said malleable dome being configured to withstand pressurized air loading applied to said concave aft surface relative to ambient air pressure exposed to said convex front surface.

9. An aircraft forward pressure bulkhead according to claim 1, said malleable dome comprising:
   at least one malleable and deformable stiffener coupled to said full layer, said malleable and deformable stiffener being configured to enhance fail safety of said malleable dome.

10. An aircraft forward pressure bulkhead according to claim 1, said malleable dome comprising:
    a web layer coupled to said full layer, said web layer having at least one malleable and deformable stiffener defined therein, said web layer being configured to enhance fail safety of said malleable dome.

11. An aircraft forward pressure bulkhead comprising:
    a malleable dome having an outer perimeter, said malleable dome comprising a concave aft surface having a constant radius of curvature extending from a center portion to an outer edge portion, said malleable dome comprising a first full layer having the same said radius of curvature, a second full layer coupled to said first full layer having the same said radius of curvature, and a partial layer coupled to said second full layer on said concave aft surface, said partial layer being located within and around said outer perimeter, said partial layer having the same said radius of curvature at an interface with said concave aft surface; and
    an outer chord coupled to said malleable dome around said outer perimeter, said outer chord providing a rigid attachment mechanism for said aircraft forward pressure bulkhead;
    said malleable dome being configured to deform in response to a threshold amount of impact energy caused by a foreign object strike, thus absorbing and dissipating at least a portion of the impact energy, and said malleable dome being void of any rigid non-deformable reinforcement members;
    wherein said partial layer has a variable thickness that decreases towards the center of said malleable dome.

12. An aircraft forward pressure bulkhead according to claim 11, wherein said first full layer is seamless.

13. An aircraft forward pressure bulkhead according to claim 11, wherein said second full layer is seamless.

14. An aircraft forward pressure bulkhead according to claim 11, wherein said partial layer is seamless.

15. An aircraft forward pressure bulkhead according to claim 11, said malleable dome being shaped as a spherical cap.

16. An aircraft forward pressure bulkhead according to claim 11, further comprising at least one malleable and deformable tear strap layer coupled to said malleable dome, said malleable and deformable tear strap layer being configured to enhance fail safety of said malleable dome.

17. An aircraft forward pressure bulkhead according to claim 11, further comprising a web layer coupled to said malleable dome, said web layer having at least one malleable and deformable stiffener defined therein, said web layer being configured to enhance fail safety of said malleable dome.

18. An aircraft forward pressure bulkhead comprising a malleable dome, said malleable dome configured to deform in response to a predetermined threshold amount of impact energy caused by a foreign object strike, thus absorbing and dissipating at least a portion of the impact energy, said aircraft forward pressure bulkhead being void of any rigid non-deformable reinforcement members;

said malleable dome comprising a concave aft surface having a constant radius of curvature extending from a center portion to an outer edge portion;

at least one full layer on a convex side of said malleable dome, said at least one full layer having the same said radius of curvature;

a partial layer coupled to said at least one full layer on a concave side of said at least one full layer on said concave aft surface, said partial layer being located within and around an outer perimeter of said at least one full layer, said partial layer having the same said radius of curvature at an interface with said concave aft surface; and wherein said partial layer has a variable thickness that decreases towards the center of said malleable dome.

* * * * *